Jan. 10, 1933.  B. L. ROGERS  1,894,123
HARVESTER THRESHER
Filed Oct. 17, 1928  3 Sheets-Sheet 2

Inventor
B. L. Rogers,
By H. P. Doolittle,
Atty.

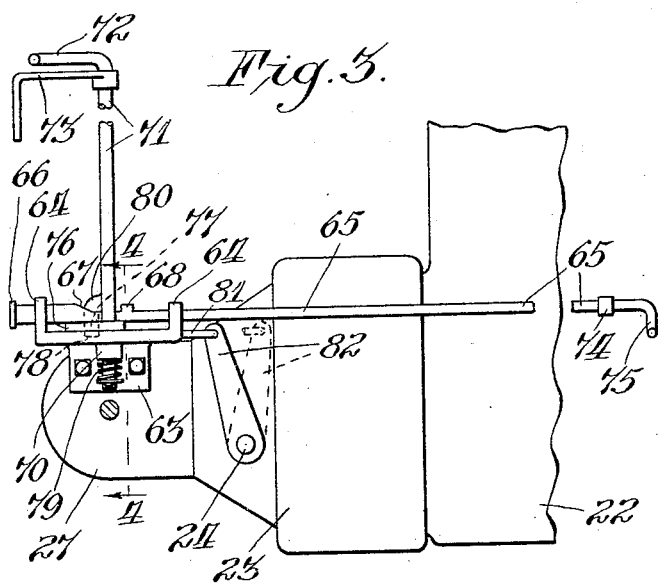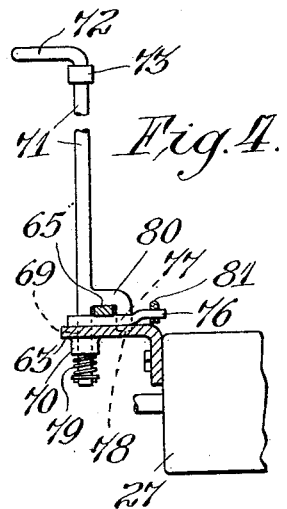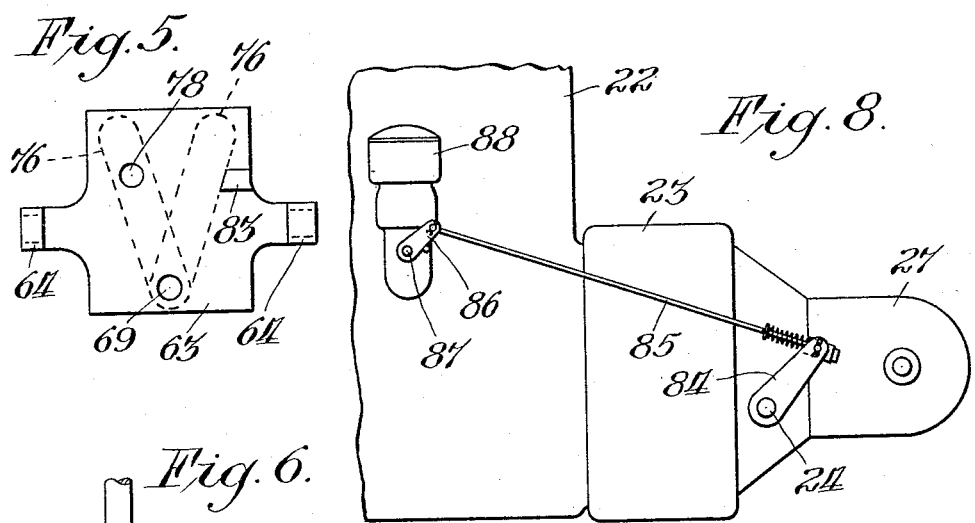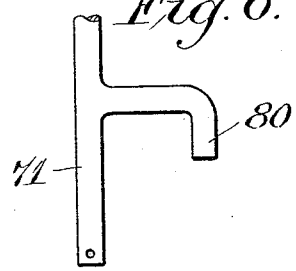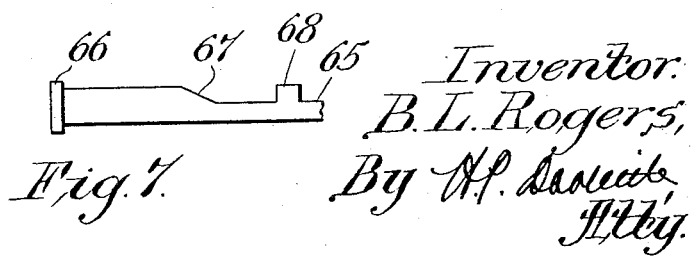

Patented Jan. 10, 1933

1,894,123

UNITED STATES PATENT OFFICE

BIRD L. ROGERS, OF FARNSWORTH, TEXAS

HARVESTER THRESHER

Application filed October 17, 1928. Serial No. 312,981.

The invention relates to a harvester thresher.

Such machines are now practically of standard construction and employ a main frame carried on wheels, one side of the frame carrying a thresher part with a feeder leading thereto, and the opposite side of the frame carrying a harvester part constituting the grain gathering mechanism including a feeder directing the grain to the feeder for the thresher part. An engine is carried on the frame for driving the operative mechanisms of these harvester and thresher parts of the machine. As the machine moves through the grain, it will, of course, encounter varying heights of grain, which makes it necessary for the operator to adjust the gathering platform up or down in accordance with such varying heights of grain encountered.

A station is usually provided on the machine where the operator positions himself to effect this control of the platform. With respect to the location of this operator's station, harvester threshers may be classified in two groups. The first group is of that kind which positions this station at the forward end of the machine in advance of the feeder for the thresher part, which location substantially coincides with the location of the old teamster's seat in the days when harvester threshers were drawn by horses or mules. The second group is of the kind having what might be termed an operator's bridge or platform, either on top of the thresher part or at the grainward side thereof. In the larger sizes of these machines, and perhaps also in the smaller sizes, it would be desirable to embody in the machine both of these group characteristics, so that two operator's stations are arranged on the machine, thus enabling an operator, as fancy suits him or occasion requires, to effect control of the platform and other accessory parts of the machine from either station.

Accordingly, it is the primary object of this invention to provide in a harvester thresher two stations for the operator, so that he may effect control of the platform from either station.

A further object is to carry this dual control farther by providing at each station means for controlling the clutch for the engine and also the throttle for the engine.

Another object is to provide a runway connecting the two stations in a convenient manner so that the operator need not descend from the machine if he desires to transfer his position from one station to the other.

Another object of the invention is to accomplish all of the above objects in such a manner that the dual control stations may be readily applied to standard harvester threshers now in the field without radically reconstructing the same.

Other objects will be apparent to those skilled in this art as the disclosure is completed.

Briefly, these desirable objects are accomplished by a harvester thresher of standard construction having a thresher part and a harvester part including a platform, there being an operator's station at the front part of the machine in advance of the feeder or thresher part and a second operator's station rearwardly of the first station and arranged in the illustrative embodiment herein shown on top of the thresher part, it being understood that the same may also be arranged at the grainward side of the thresher part. Means for raising or lowering the platform, in this embodiment in the form of a tiller wheel structure, is arranged at each station, the two wheels being so connected that the operator may optionally control the platform from either one and from either station. A latch means is also provided for locking the wheels to hold the platform in any desired adjusted position. Similarly, a dual control optionally operable from either station is provided for actuating the clutch for the engine which drives the operative parts of the thresher and harvester parts. Means is also associated with this clutch control for automatically regulating the throttle valve of the carburetor of the engine, as will later appear. A runway connects the two stations to permit the operator to transfer his position at will.

An illustrative embodiment of this invention is shown in the accompanying sheets of drawings, wherein:

Figure 3 is a side elevational view, as seen along the line 3—3 of Figure 1, looking in the direction of the arrows, the view illustrating on an enlarged scale the details of the clutch control mechanism;

Figure 4 is a sectional view taken along the line 4—4 of Figure 3 when looking in the direction of the arrows, the view also illustrating the details of this control;

Figure 5 is a plan view of a bracket on which is mounted the lever construction shown in Figures 3 and 4;

Figure 6 is a side elevational view of the lower end of the control lever shown in Figures 3 and 4;

Figure 7 is a detail side elevational view of the cam shipper rod; and

Figure 8 is a side elevational view of the engine as viewed along the line 8—8 in the direction of the arrows shown in Figure 1.

Figure 1:
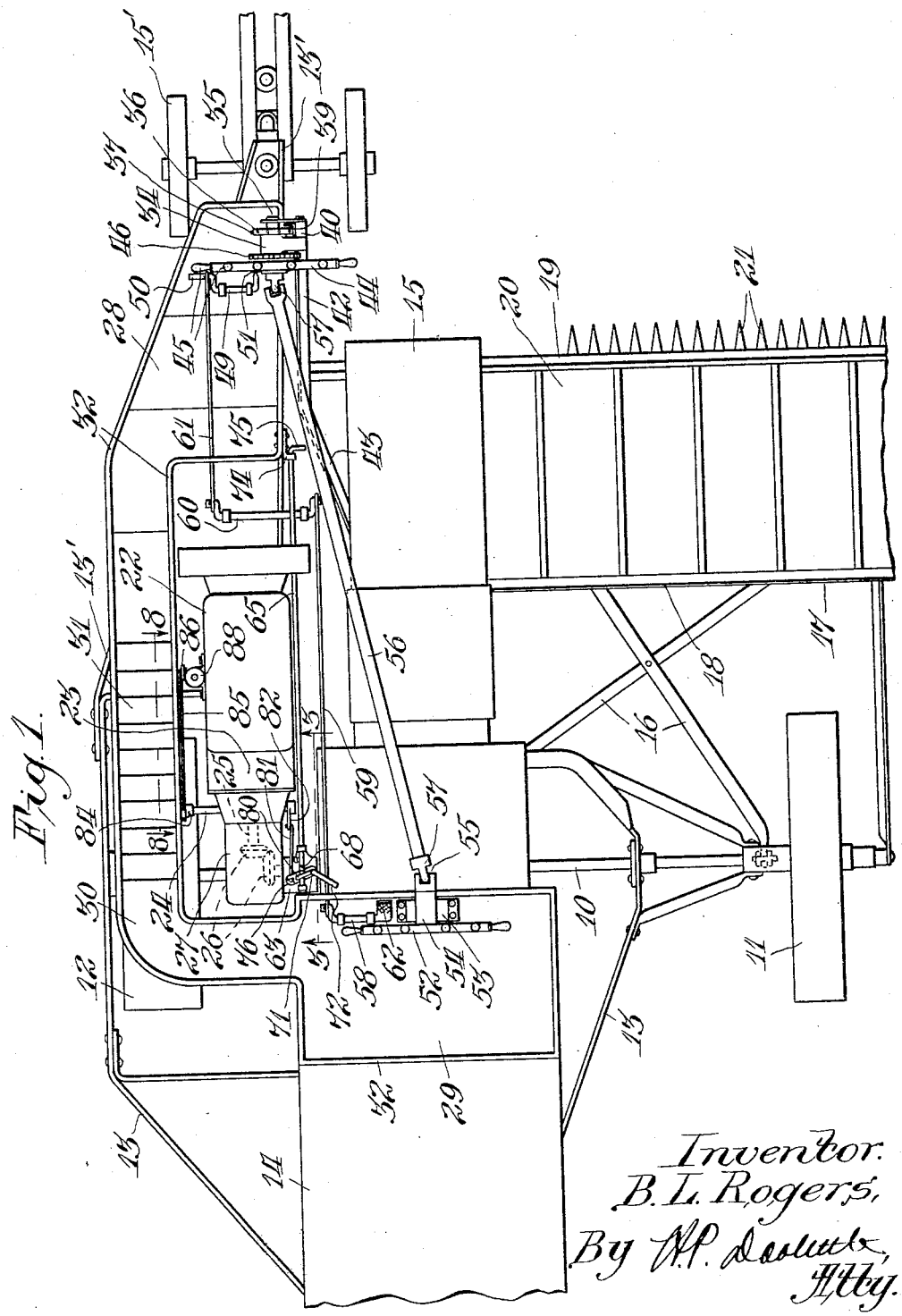
Figure 1 is a top plan view of a harvester thresher with which is associated the dual control structure of this invention.
Figure 2:
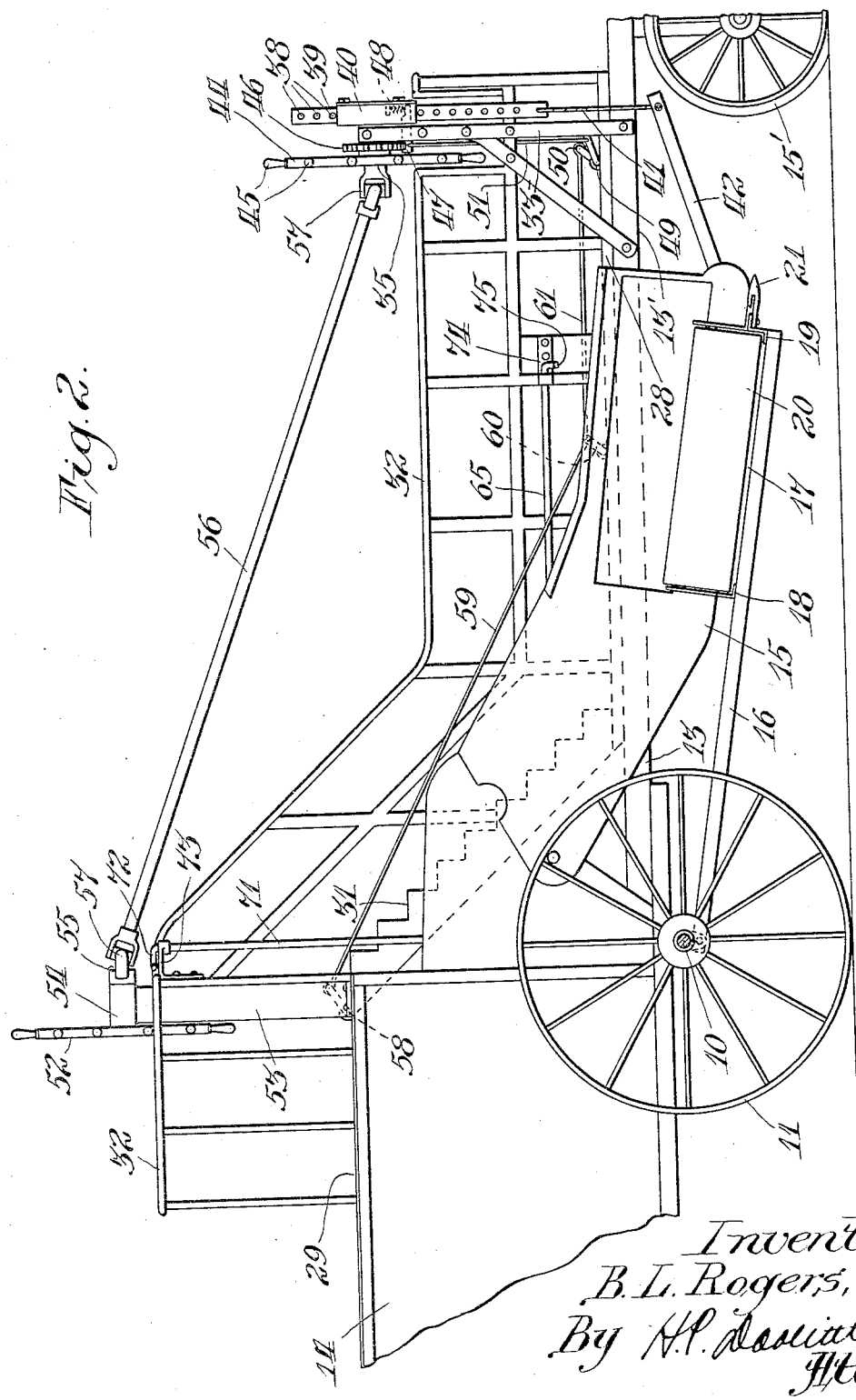
Figure 2 is a side elevational view of the structure shown in Figure 1.

As best shown in Figures 1 and 2, the harvester thresher includes the usual transverse axle 10, which is carried in a grain wheel 11 and in a main wheel 12. This axle 10 carries the usual main frame 13, and on this main frame is mounted in the usual manner the thresher body or part 14, which has positioned in advance thereof, the usual feeder housing 15. The forward part of the main frame 13 is carried on a front steering, pilot wheel truck 15'. The axle 10, grainwardly of the thresher part, pivotally carries the usual crossed, forwardly extending support bars 16, which carry at their forward end the usual platform 17 arranged on an angle bar 18 and a Z-bar 19, the platform carrying the usual transversely running apron conveyor 20, which receives the grain from the cutting apparatus indicated at 21 mounted along the front ends of the Z-bar 19.

The main frame 13 carries, in any approved manner at its stubbleward side, an engine 22, which engine includes at its rear end the usual clutch housing 23. A clutch operating shaft is indicated at 24. The engine drives a longitudinally and rearwardly extending shaft 25 for operating gearing 26 in a transmission casing 27, and from these gears 26, in any approved manner, may be driven the operative parts of the thresher part and the harvester part, such structure not having been shown, as it unnecessary to a disclosure of this invention.

As the machine moves along, the operator must raise or lower the platform 17 so as to adjust the height of cut in accordance with the varying heights of grain encountered. In the harvester thresher of this invention, the operator may do this optionally from either one of two positions, which construction will now be described.

The forward, stubbleward end of the main frame 13 constitutes an A-frame structure 13' on which is arranged a platform 28 serving as the front operator's station. The top of the thresher part 14 at the back end of the machine is provided with a second operator's station 29, the two stations being connected by a runway 30. A stairway 31 is provided between the two stations, as the station 29 is considerably elevated above the station 28. A railing 32 incloses the stations and runway so as to eliminate any danger of the operator falling from the stations or the runway. As best shown in Figure 2, an upright frame structure 33 is carried at the grainward side of the A-frame 13', which frame supports at its upper end a bearing sleeve 34 in which is rotatively journaled a longitudinal stub shaft 35 carrying a pin wheel 36 having spaced pins 37 on its periphery, which engage with holes 38 in a vertically disposed rack bar 39 slidable in a guide bracket 40, said bar at its lower end being connected with a cable 41 having connection with an arm 42, which is an extension of a stubblewardly disposed frame element 43 which helps support the platform 17. A tiller wheel 44 having hand grip members 45 is made fast on the shaft 35 so that, when the wheel 44 is turned, it will turn the shaft 35 and the pin wheel 36, thus causing the rack bar 39 to be raised or lowered in accordance with the direction of turning movement of the tiller wheel 44. Intermediately of the tiller wheel 44 and pin wheel 36, the shaft 35 carries a rack wheel 46, with which a latch bar 47 is adapted to engage, pivoted on the frame 33 and normally held in position to engage between the teeth of the rack wheel 46 by means of a small spring 48. A crank 49 is carried on the floor of the platform 28 and is operable by a foot treadle part 50, so that an operator with his foot may turn the crank 49 to move a link 51 downwardly to release the latch bar 47 from the rack wheel 46 against the force of the spring 48, so that the tiller wheel 44 is free to be turned to raise or lower the rack 39 for raising or lowering the platform 17. It will be understood that a usual form of counterbalancing spring is provided, which has not been shown, for assisting the operator in raising the weight of the platform. It is also understood that, due to its own weight, the platform will go down by itself when the tiller wheel is free to turn. Of course, it will go down slowly on account of the counter-balancing mechanism, and thus will not get out of control of the operator.

A second tiller wheel 52, identical in construction with the wheel 44, is mounted on a support 53 secured to the floor of the station 29, there being a bearing sleeve 54 at the upper end of the support 53 in which a shaft 55 connected to the wheel 52 is carried. The two tiller wheels 44 and 52 are then connected by an inclined shaft 56, there being universal joints 57 to make the shaft operate properly, due to the difference in the levels of the two tiller wheels.

Of course, the operator could not adjust the platform 17 from the tiller wheel 52 without first providing means for disconnecting the latch 47, which frees the tiller wheel 44. Accordingly, such mechanism is provided which comprises a crank shaft 58 on the floor of the platform 29, said crank shaft being connected to a forwardly and downwardly extending link 59 which is connected to a crank shaft 60, said crank shaft 60 in turn having a link connection 61 with the foot treadle 50 on the crank shaft 49. A foot treadle 62 is provided on the crank shaft 58, whereby the operator at the station 29 may actuate the crank shaft 58 with his foot, to move the crank 49 at the forward station 28, whereby the rod 59 releases the latch bar 47 to free the front tiller wheel, whereupon the platform 17 may be adjusted from the rear tiller wheel 52 at the station 29.

As the engine 22 is always cranked by hand, the clutch therefor must be disconnected, because it would be impossible to crank the engine, if the operative parts of the thresher and harvester were in connection therewith. Accordingly, it will be understood that mechanism is provided for holding the same in its out position at all times, unless positively thrown in and connected by the act of the operator. Accordingly, means must be provided for actuating the clutch from either operator station. This means will next be described.

The gear housing 27 at the back of the clutch housing 23 carries an offset shelf bracket 63 (see Figures 3 and 4), which bracket includes aligned, oppositely disposed eyes 64 through which is slidable a control rod 65 (see also Figure 7), which rod includes an end stop 66, a cam 67, and an intermediate stop 68.

The bracket 63 includes a through opening 69 at one side, which is formed with a bearing 70 for slidably and turnably carrying a vertically disposed shaft 71 having a crank handle 72 at its upper end. The upper end of the shaft 71 is carried in a support 73 carried in any suitable manner, as by connecting the same to the upper part of the railing 32 at the station 29. The rod 65 extends longitudinally forwardly where it is carried in a bracket 74, said rod 65 including at its front end, a handle 75 accessible to the operator when he is standing on the platform 28 at the front of the machine.

Loosely pivoted to the vertical shaft 71 is a horizontally disposed lever 76, which is positioned between the shelf of the bracket 63 and the rod 65, said lever 76 having an opening 77 therethrough, which is adapted to register with a depression 78 in the shelf 63. The lower end of the lever 71 carries a spring 79 which exerts a force to hold the shaft 71 down. The shaft 71 includes a laterally and downwardly extending hook part 80 which normally engages through the hole 77 in the lever 76 and into the depression 78 in the shelf 63, where the spring 79 holds the parts normally, so that the lever 76 is normally locked in its out position, or in the position shown in the dotted lines at the left in Figure 5. As this lever 76 is connected by a rod 81 (see Figure 1) to a crank 82 which rocks the clutch shaft 24, it will be seen that this out position of the lever 76 means that the clutch is held out, or disengaged.

If the operator is at the station 29, and, assuming that he has started the engine and that he now desires to throw the clutch in to drive the parts of the thresher and harvester, he grasps the handle 72, to raise the shaft 71 axially, against the force of the spring 79, to release the hook 80 from the depression 78 in the bracket 63. It is to be understood that the spring 79 is of such tension that the lever 71 cannot be raised enough to disengage the hook 80 from the hole 77 in the lever 76. The operator now turns the shaft 71 by means of the handle 72 and this causes the lever 76 to move to the position shown in the dotted lines at the right of Figure 5, which brings the lever 82 to the dotted line position shown in Figure 3 for rocking the clutch shaft 24 to throw the clutch in, or engage the same. Of course, it will be understood that the springs usually included in the clutch will also throw the clutch in by itself quite independently of any turning movement of the shaft 71 by the operator, when the lever 76 has been released by the operator, as has been described. If the operator desires to throw the clutch out from the station 29, he merely manipulates the shaft 71 by turning the same back to bring the lever 76 to its out position, and then the spring 79 returns the end of the hook 80 to the hole 78, securely to lock the parts in the out position.

Assuming that the operator is at the forward station 28 and that the clutch is held in its out position, as shown in full lines in Figure 3, and that he desires to engage the clutch from his forward position at the station 28, he thereupon grasps the handle 75 at the forward end of the rod 65 and pulls the same toward him.

That causes the cam 67 at the back end of the rod 65 to ride under the hook 80 to raise the shaft 71, as will be clear, a sufficient distance to release the lever 76, and thereupon the clutch is free to engage itself because of the springs included therein, which normally tend to hold the clutch in its in, or engaged position. If the operator desires to throw the clutch out from his position at the forward station 28, he merely pushes the rod 65 rearwardly, and then the stop 68 engages the bight of the hook 80 and springs the shaft 71 to its position where the hook thereof will engage the hole 78, and then the spring 79 returns the hook to the hole to lock the lever 76, as will be clear. A stop 83 is shown in Figure 5 to limit the in movement of the lever 76. It is to be understood that the lever 76 in both positions, in and out, in Figure 5 is shown in dotted lines for the purpose of making clear the structure of the hole 69 and depression 78 in the plate 63.

When the engine is under load, that is, when the clutch is in and the engine is driving the parts of the harvester thresher, the usual governor for the throttle valve of the carbureter regulates the operation of the engine. Such automatic governor is not shown. However, when the clutch is suddenly disengaged so that the engine no longer is under load, the engine is usually caused to race, which is objectionable. Accordingly, this invention contemplates mechanism for closing the throttle of the carbureter when the clutch is thrown out to prevent this objectionable racing of the motor. This structure is shown in Figure 8 and comprises a lever 84 at the stubbleward side of the clutch shaft 24, which lever has a rod connection 85 with a crank 86 that controls the shaft 87 on which the throttle valve for the carbureter 88 is mounted. It will be clear now that when the clutch shaft 24 is rocked to disconnect the clutch, the rod 85 moves in a direction to close the throttle to the carbureter and prevent racing of the engine at this time.

In the use of the harvester thresher of this invention, it will now be seen that the operator may control the functions of the engine and adjustment of the platform from either the forward position on the platform 28 or from the rearward and upper station 29 on top of the thresher body. It will also be seen that this structure embodies tiller wheels 44 at the front, and 52 at the back, which are so inter-connected that the operator may control the platform from either station. The latch bar 47, which locks the front tiller wheel 44, also locks the rear tiller wheel 52, because when the front tiller wheel 44 is locked, the back tiller wheel 52 cannot be operated. The rod 51, which controls the latch 47 may be operated at the front station by actuating the crank 49, and, from the back station, by actuating the crank 58, as has been described. When the operator releases his foot from the treadle which controls these cranks 49 and 58, the spring 48 quickly and automatically re-engages the latch bar 47 with the rack wheel 46 to lock the tiller wheels and to hold the platform in adjusted position. By means of the rod 65, controlled either by the handle 72 on the shaft 71 or the handle 75 on the rod 65, the operator, by the mechanism described, is enabled to control the clutch for the engine from either station. When the clutch is thrown out through the rod 85, the throttle is closed to prevent racing of the engine. The runway 30 and stairway 31 connect the two stations 28 and 29, so that the operator may freely move from one to the other as occasion requires and operate the controls just as well from one position as from the other.

From this description and disclosure it must now be clear that the mechanism described achieves all of the desirable objects of the invention heretofore expressed. It is to be understood that the invention is susceptible of many changes and modifications differing from the illustrative form of the invention herein disclosed without necessarily departing from the spirit and scope of the invention. It is the intention to cover all such changes as do not depart from this invention as is indicated in the following claims.

What I claim is:

1. A harvester thresher having an element to be controlled, two spaced operator stations on the harvester thresher, each station including means for effecting control of said element, and a runway connecting said stations.

2. A harvester thresher having a thresher part, a harvester platform adapted to be adjusted up or down, an operator's station at the forward part of the harvester thresher, an operator's station on the thresher part, a runway connecting the two stations, and means at each station for effecting up and down adjustment of the platform.

3. A harvester thresher having a thresher part, a harvester part including a platform adapted for up or down adjustment, an operator's station, a second operator's station spaced from the first, a tiller wheel mounted at each station, means connecting said wheels to operate together, means operated by one of said wheels for adjusting the platform up or down, means for locking said tiller wheels against rotation, and means at both stations for unlocking said locking means to enable the operator at either station to operate either of said tiller wheels.

4. A harvester thresher having an axle carrying a main frame, a thresher part at the stubbleward side of the frame, an operator's station at the front stubbleward side of the main frame, a harvester platform pivotally connected to the grainward side of said axle for up and down adjustment, an operator's station on the thresher part, means at each station for effecting adjustment of said platform, means for locking one of said adjusting means, and means controlled from either station for unlocking said locking means.

5. A harvester thresher having a plurality of elements to be adjusted, a pair of relatively widely spaced operator control stations on said harvester thresher, a runway connecting the stations, and an interconnected control means for adjusting said elements from either one of said stations.

6. A harvester thresher having a plurality of elements to be adjusted, a pair of relatively widely spaced operator control stations on said harvester thresher, said stations being at different levels, a runway including a stairway connecting said stations, and means at each station for adjusting said elements.

7. A harvester thresher having a harvester platform adapted to be adjusted up or down, a pair of relatively widely spaced operator control stations on said harvester thresher, a runway including a stairway connecting said stations, and control means at each station for effecting the adjusting of said platform.

8. A harvester thresher having a thresher part, a harvester part, a harvester part comprising a platform adapted to be adjusted up or down, relatively widely spaced operator control stations on the harvester thresher, an engine on the harvester thresher having a clutch for controlling the drive to the thresher and harvester parts, and control means at each station for controlling the clutch and adjusting the harvester platform.

9. A harvester thresher having a plurality of elements to be adjusted, a plurality of spaced operator stations for the harvester thresher, a runway connecting the stations, and means at each station for adjusting said elements.

In testimony whereof I affix my signature.

BIRD L. ROGERS.